UNITED STATES PATENT OFFICE.

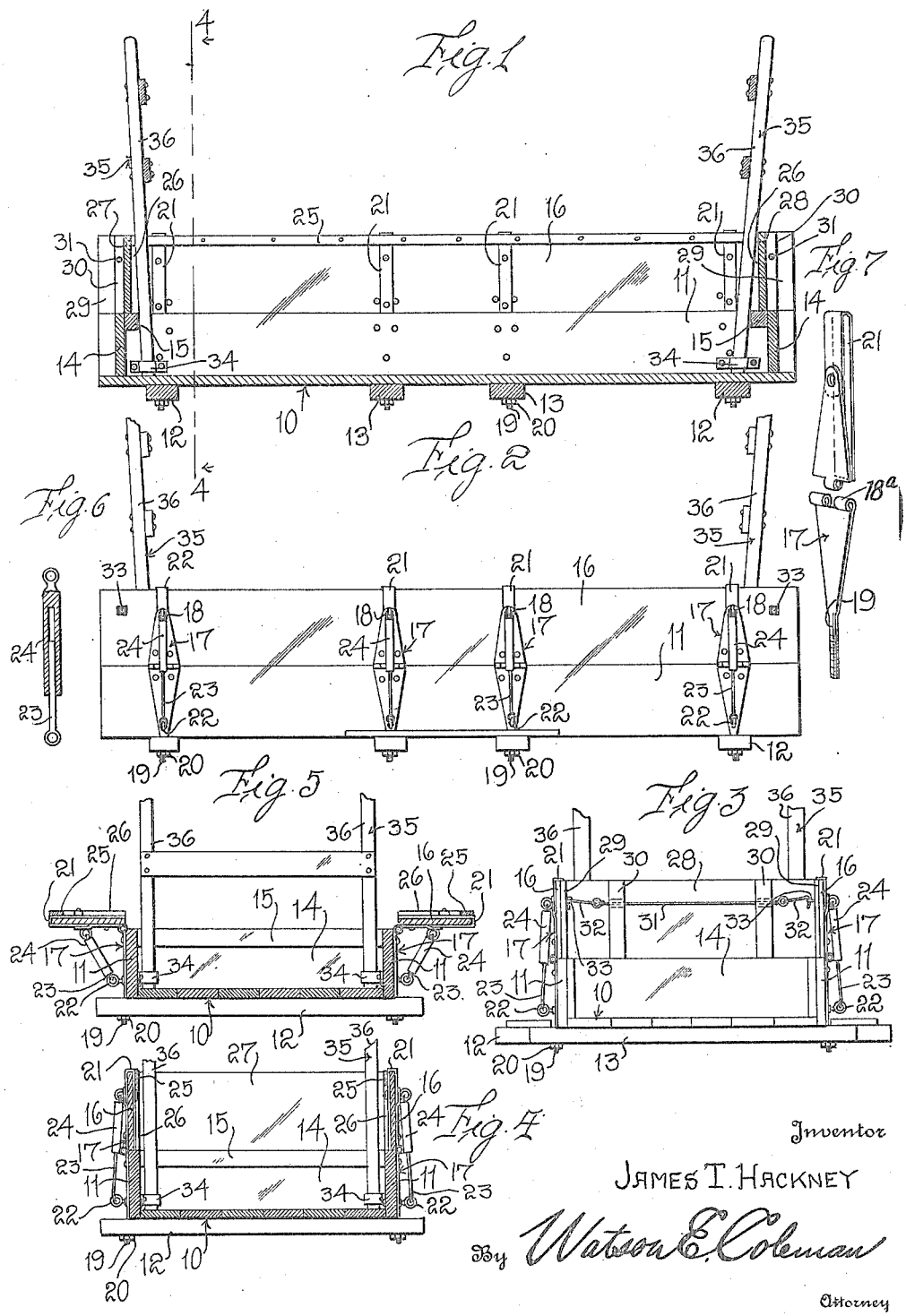

JAMES T. HACKNEY, OF VERSAILLES, KENTUCKY.

CONVERTIBLE VEHICLE-BODY.

1,273,362.   Specification of Letters Patent.   Patented July 23, 1918.

Application filed February 25, 1918. Serial No. 219,061.

*To all whom it may concern:*

Be it known that I, JAMES T. HACKNEY, a citizen of the United States, residing at Versailles, in the county of Woodford and State of Kentucky, have invented certain new and useful Improvements in Convertible Vehicle-Bodies, of which the following is a specification, reference being had to the accompanying drawings.

This invention relates to vehicle bodies, and particularly to means whereby a wagon body may be converted either into a rack, such as is used for carrying hay or other commodities, or into a box wagon.

The general object of the invention is to provide a construction of this kind which is very simple, may be cheaply made, and which is thoroughly effective.

A further object is to provide improved means for bracing the upper sections of the wagon box sides when the latter are turned into an approximately horizontal position, which bracing means adds to the strength of the hinges which engage the outer sections of the sides with the lower sections.

A further object is to provide a convertible wagon body which is adapted to be converted by a single operator, and in this connection to provide means upon the end gates for supporting the upper sections of the sides in vertical position, said means permitting one side section to be turned upward or downward and then permitting the other side section to be turned upward or downward.

Other objects will appear in the course of the following description.

My invention is illustrated in the accompanying drawings, wherein—

Figure 1 is a longitudinal sectional view of my improved wagon showing the body arranged as a box body;

Fig. 2 is a side elevation of the construction shown in Fig. 1;

Fig. 3 is a rear end view of the construction shown in Fig. 1;

Fig. 4 is a sectional view on the line 4—4 of Fig. 1;

Fig. 5 is a like view to Fig. 4 but showing the member 16 turned down to convert the body into a hay rack;

Fig. 6 is a detail longitudinal sectional view of the braces 23 and 24; and

Fig. 7 is a perspective view of one of the hinges, the leaves being separated and showing the strip 21 in place.

Referring to these drawings, 10 designates the bottom of the wagon body or bed having the vertically extending side boards 11, which are permanently held in a vertical position, these side boards 11 constituting the lower sections of the sides of the wagon body. Extending transversely across beneath the bottom and engaged therewith, are a plurality of transverse beams 12 and 13, the beams 12 being disposed at the ends of the wagon body and the beams 13 being disposed on each side of the middle of the wagon body.

Extending across the ends of the wagon body and having a height equal to the height of the sections 11 are the end boards 14. These end boards are made of hard wood and the forward end board is bolted in place. The rear end board, however, is detachably held in place. Extending across the ends of the wagon body just inward of the end boards 14, are the transverse braces 15. Hingedly mounted upon the sections 11 are the sections 16 which are preferably made of relatively soft wood and have a width slightly greater than the width of the sections 11. Each section 16 is connected to the section 11 by means of hinges 17 disposed immediately above the beams 12 and 13. The upper leaf of each hinge 17 is formed at its upper end with an eye 18$^a$ and the lower end of each lower leaf is reduced in thickness to form a bolt shank 19 which passes through the corresponding beam 12 or 13 as the case may be, these bolt shanks being provided with nuts 20, as shown in Fig. 5.

Reinforcing strips of metal, designated 21, extend upward on the inside of the sections 16, are turned over the outer edges of these sections, and then down on the outside of the sections, beneath the upper leaves of the hinges to receive the shank of the eye bolt 18. There are, of course, as many of these strips 21 as there are hinges.

Extending through the lower ends of the lower leaves of the hinges 17 are the eye bolts 22. Pivotally connected to each of these eye bolts 22 is a rod 23 which is formed at its lower end to pivotally engage the eye bolt and swingingly or pivotally engaging each eye bolt 18 is a tubular member 24 in which the rod 23 telescopes or has sliding movement. Preferably the upper end of the tube 24 is flattened and perforated to receive the eye of the eye bolt 18. These braces formed by the members 23 and 24 are of such length that when the upper sections 16 are turned into nearly a right angular relation to the lower sections 11, the members 23 and 24 will telescope, as illustrated on the left hand in Fig. 5, and form braces supporting the side sections 16 in their angular relation. When these side sections 16 are turned upright in a vertical position, the members 23 and 24 slide within each other so as to accommodate this position of the side member.

Preferably the outer edge of each section 16 has a reinforcing strip 25 bolted to it which extends nearly the entire length of the section and at its ends is connected to downwardly extending strips 26 against which the end gates 27 and 28 engage. The extremities of the sections 16 are also provided with vertical strips 29 defining grooves between which the end gates 27 and 28 are slidable. These end gates 27 and 28 are provided with vertical reinforcing strips 30, which bear at their lower ends upon the beams 15, and extending transversely through these strips 30 is a rod 31, this rod 31 being shiftable through the strips and carrying on its ends the hooks 32 which have swingingly engaged eyes on the ends of the rods 31. These hooks are adapted to engage with eye bolts 33 engaging the ends of the member 16.

For the purpose of supporting end racks upon the wagon body, I provide at opposite ends of the sections 11, the straps 34, the middle of each of these straps being outwardly bent. The racks 35 have vertical members 36 which engage within these outwardly bent portions of the straps to thus hold the racks in vertical position but permit the ready removal of the racks when desired.

The manner in which this convertible wagon body is used will be obvious from the description, but it is to be particularly pointed out that with this construction one man can convert the wagon body. Thus, if it be desired to convert the body from a hay rack to a box body, the operator simply lifts up on one of the upper sections 16, there being no impediment to the upward and inward movement of the section on its hinges, and then connects the adjacent hook 32 to the eye bolt 33. He can then lift the other section 16 and connect it to the hook 32 and then proceeding to the front of the wagon connect the respective hooks 32 to their eye bolts 33. Of course the body may be as easily converted from a box to a hay rack as when the side sections 16 are turned down to their angular position, they are immediately braced just as soon as the two sections have telescoped their full extent.

One of the main objects of my invention is to maintain simplicity and cheapness in the construction of this wagon body and to reduce the parts to the smallest number possible for effective service. It will be noted that the means for holding the sections 16 in a vertical position also provides for locking the end gates 27 and 28 in position against vertical movement and that the rod 31 has a limited sliding movement in the strips 30 so that the outward pressure on one of the sections 16 is transmitted to the other section and is counterbalanced thereby.

Having described my invention, what I claim is:—

A wagon body of the character described including a floor, permanent side sections attached to the floor and extending upwardly therefrom, side sections superposed upon the first named side sections, hinges connecting the side sections at a plurality of points, each of said hinges being reduced at its lower end to form a screw-threaded bolt shank, beams passing beneath the bottom of the wagon and through which said shanks pass, nuts engaging the bolt shanks and holding the beams in place, strips attached to the inside faces of the swinging side sections extending upward over the outer edges thereof and then downward beneath the upper ends of said hinges, eye bolts passing through the upper ends of the hinges and through said strips, eye bolts passing through the lower ends of said hinges and the permanent side sections, telescopic bracing members respectively connected to the upper and lower eye bolts, and means for holding the hinged side sections in vertical position.

In testimony whereof I hereunto affix my signature in the presence of two witnesses.

JAMES T. HACKNEY.

Witnesses:
    KATHERINE LANNON,
    ESSIE DAUGHERTY.